H. N. NELSON.
CRANE.
APPLICATION FILED APR. 16, 1919.

1,316,589.

Patented Sept. 23, 1919.
2 SHEETS—SHEET 2.

INVENTOR
H.N. Nelson,
BY
ATTORNEYS

UNITED STATES PATENT OFFICE.

HOWARD N. NELSON, OF NORTHWOOD, NORTH DAKOTA.

CRANE.

1,316,589.  Specification of Letters Patent.  Patented Sept. 23, 1919.

Application filed April 16, 1919. Serial No. 290,405.

*To all whom it may concern:*

Be it known that I, HOWARD N. NELSON, a citizen of the United States, and a resident of Northwood, in the county of Grand Forks and State of North Dakota, have made certain new and useful Improvements in Cranes, of which the following is a specification.

My invention is an improvement in cranes, and has for its object to provide a device of the character specified, especially adapted for lifting wagon bodies, racks, and the like from the running gear of wagons, and for replacing the same on the running gear, wherein the crane as a whole is easily transported from place to place and is easily operated to remove or replace the body or rack.

In the drawing:—

Figure 1:
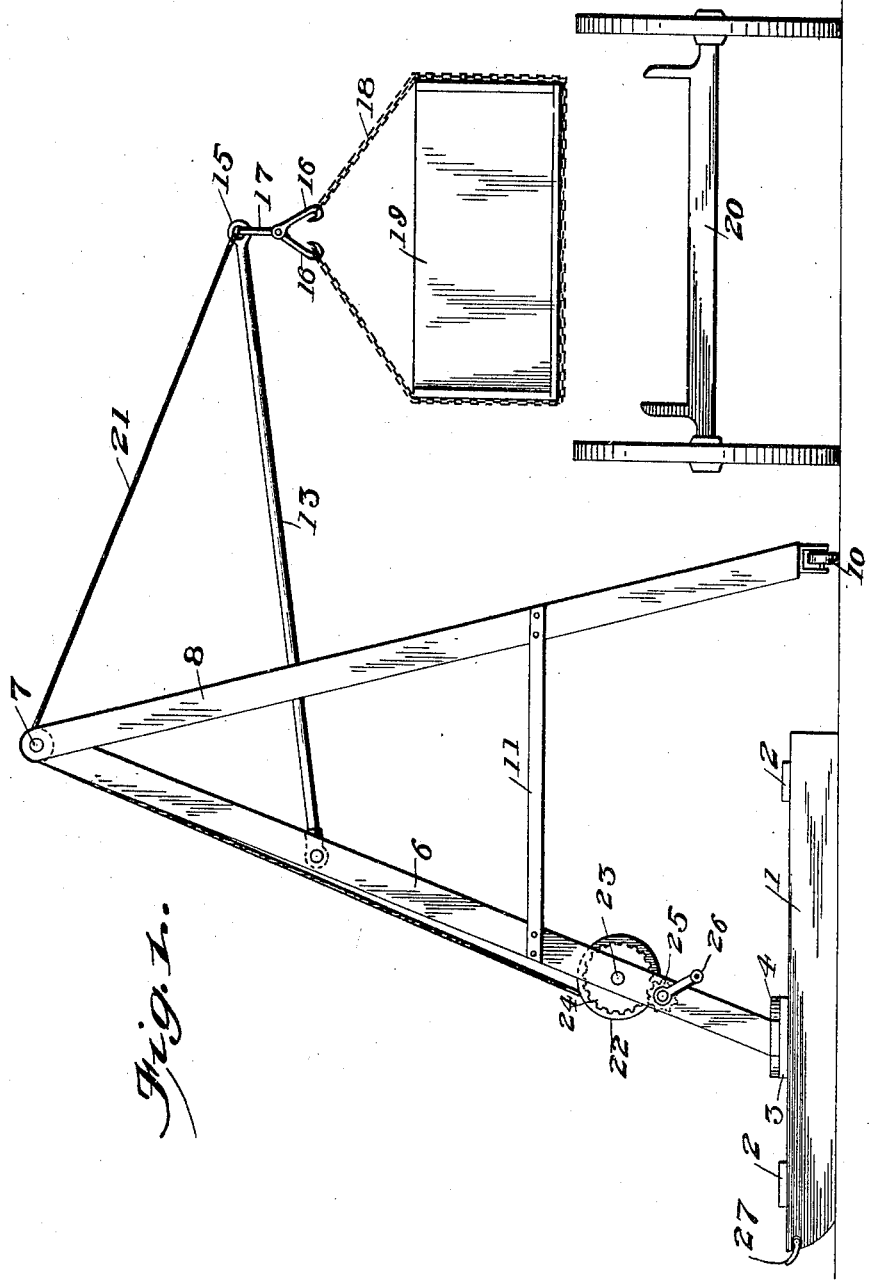
Figure 1 is a front view showing the improved crane in operation.
Figure 2:
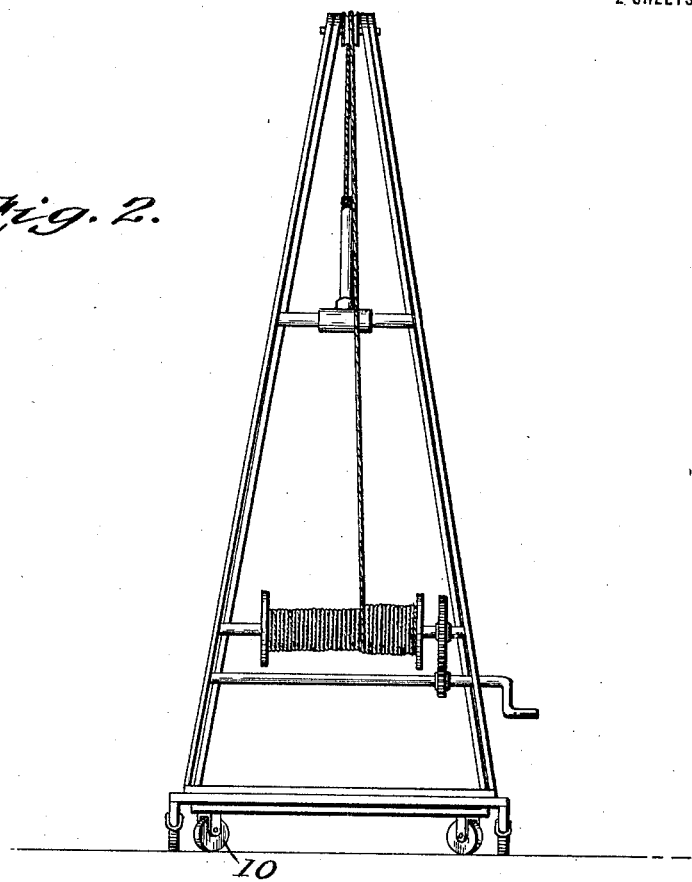
Fig. 2 is an end view.

In the present embodiment of the invention a suitable base and carriage is provided in the form of a sled, and composed of runners 1, which are connected by cross plates 2 and 3. The cross plate 3, which is intermediate the ends of the runner has pivoted thereto a bolster 4, the said bolster being pivoted as indicated at 5. Standards 6 extend upwardly from the ends of the bolster. These uprights are pivotally connected at their tops by a bolt 7, and other standards 8 are pivoted onto the bolt. These standards 8 are connected at their lower ends by a cross plate 9, and caster wheels 10 are mounted on the plate 9. The uprights 8 are braced against the upright 6 by brace 11, and a pulley 12 is journaled on the bolt 7 at the center thereof.

Figure 3:
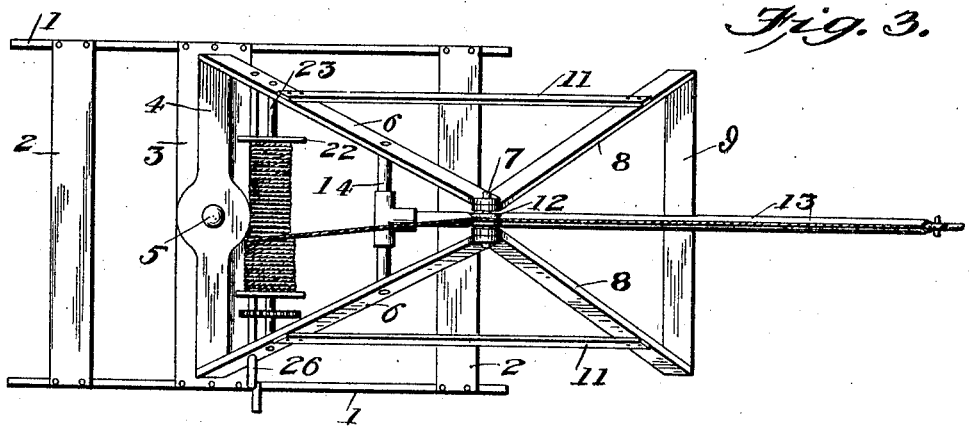
Fig. 3 is a top plan view.

Referring to Fig. 3 it will be noticed that the upper ends of the standards 8 are at the inner sides of the standards 6, and that the pulley 12 is between the standards 6.

A boom 13 is supported by the standards 6, the said boom having a cross head 14 at its inner end whose ends are pivoted in the standards 6, the cross head extending between the standards.

Referring to Fig. 3 it will be noticed that the boom and the cross head are of piping, being connected by a T as shown, and the boom has an eye 15 at its outer end. With this eye is connected a grapple consisting of a pair of hooks 16, which are pivotally connected to a link 17, the said link being pivoted to the eye. These hooks are adapted to engage the ends of a flexible member 18, as for instance a chain or chains which encircle the body 19 to be lifted from or to a place on the running gear 20 of the wagon.

It will be understood that two chains may be used, one near either end of the body or rack, the ends of the chain being brought around the body and engaged with the hooks.

A flexible member 21, as for instance a rope or cable, is connected at one end with the eye, and passes from the pulley 21 to wind at the other end upon a reel 22, which has a shaft 23 journaled in the standards 6. This shaft is provided at one end with a gear wheel 24, and the gear wheel meshes with a pinion 25 on a crank shaft 26, journaled in the standard parallel with the shaft 23. Thus by turning the crank shaft by means of the crank the reel may be turned to wind or unwind the cable to raise or lower the boom.

Referring to Fig. 1 it will be noticed that the runners have loops or keepers 27 at their forward ends to which draft apparatus may be connected for transporting the crane.

In operation, the crane is brought to the place where it is to be used, or the wagon is brought adjacent to the frame. The grapple is engaged with the body or rack to be lifted with the boom in lowered position. Now, the crank shaft is turned to wind up the rope 21, to lift the boom, and to lift therewith the rack or body.

In removing the rack or body it is lifted clear of the wheels, as shown in Fig. 1, and is then swung to one side, or the running gear may be run out from beneath the body. In placing the rack or body it is lifted into the position of Fig. 1, after which it may be swung over the running gear or the running gear may be run into a position beneath the rack or body, after which it is lowered into place.

I claim:—

1. A crane composed of a runner supported base, a bolster pivoted on the base to swing with respect thereto, a superstructure carried by the bolster, a boom pivoted to the superstructure and carrying at its outer end a grapple, a pulley at the top of the superstructure, a reel journaled on the superstructure and having means for rotating the same, a flexible member passing over the pulley and connected at one end to the boom and winding at the other end of the reel, said superstructure comprising a pair of uprights secured to the ends of the bolster, a pair of uprights pivoted to the top of the first named uprights, and carrying caster wheels at their lower ends adapted to run upon the ground, and rigid braces between the corresponding members of the pair.

2. A crane composed of a base, a bolster pivoted to the base to swing thereon, a superstructure comprising a pair of uprights secured to the ends of the bolster and a pair of uprights connected to the top of the first named uprights and carrying caster wheels at their lower ends adapted to run upon the ground about the case, said uprights being rigidly connected, a boom pivoted to the superstructure, and hoisting mechanism connecting the boom to the superstructure, said boom carrying grapples.

HOWARD N. NELSON.

Copies of this patent may be obtained for five cents each, by addressing the "Commissioner of Patents, Washington, D. C."